(12) United States Patent
Deibel et al.

(10) Patent No.: US 6,228,274 B1
(45) Date of Patent: *May 8, 2001

(54) RENEWABLE FILTER

(75) Inventors: Richard J. Deibel, Bamberg; Patrick M. Dugan, Lake Wylie, both of SC (US)

(73) Assignee: Dei-Tec Corporation, Bamberg, SC (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/951,387

(22) Filed: Oct. 16, 1997

Related U.S. Application Data

(60) Provisional application No. 60/033,387, filed on Dec. 17, 1996.

(51) Int. Cl.[7] ..................... B01D 35/30
(52) U.S. Cl. ............. 210/798; 210/443; 210/497.3; 210/DIG. 17; 156/69; 156/73.1
(58) Field of Search ................. 210/443, 444, 210/493.2, 797, 798, 445, 497.3, 453, 454, DIG. 17; 156/69, 73.1

(56) References Cited

U.S. PATENT DOCUMENTS

| | | | |
|---|---|---|---|
| 3,458,050 | * | 7/1969 | Cooper ........................ 210/493.2 |
| 3,954,625 | * | 5/1976 | Michalski ........................ 210/445 |
| 4,259,419 | * | 3/1981 | Uba et al. ........................ 156/69 |
| 4,558,957 | * | 12/1985 | Mock et al. ........................ 156/69 |
| 5,783,078 | | 7/1998 | Roll et al. ........................ 210/444 |

OTHER PUBLICATIONS

PCT International Search Report for PCT/US00/19075, International filing date Jul. 13, 2000.

* cited by examiner

*Primary Examiner*—Matthew O. Savage
(74) *Attorney, Agent, or Firm*—Brinks Hofer Gilson & Lione

(57) ABSTRACT

A twist-on renewable filter comprising a one-piece hollow housing, made of polymeric material having threads for attachment to a distribution head assembly. A filter element is adhesively bonded at one end to the floor of the housing and at its opposing end to the top member of the one-piece hollow housing. The one-piece hollow housing has an input opening and a exit opening. The filter housing is fabricated from components that are made of a polymeric material. The renewable filter can be cleaned by the introduction of a cleaning solution in a direction opposite to the direction of normal flow.

4 Claims, 3 Drawing Sheets

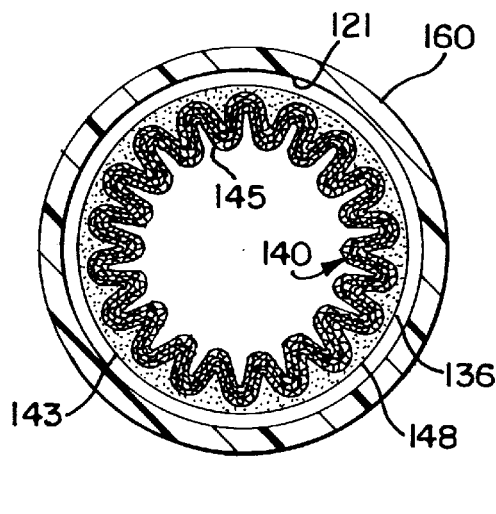
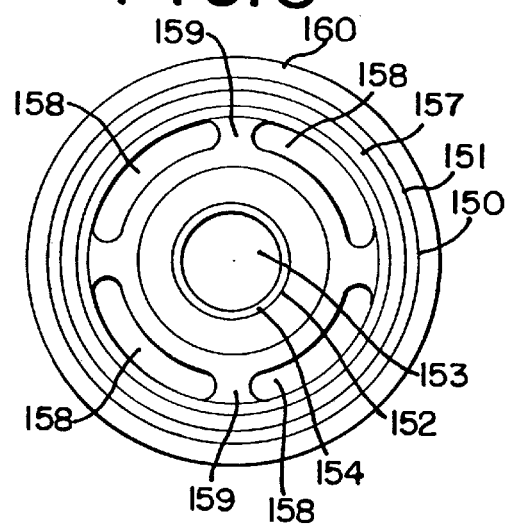
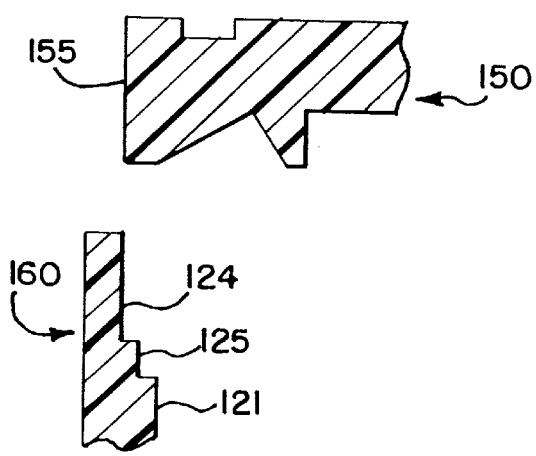
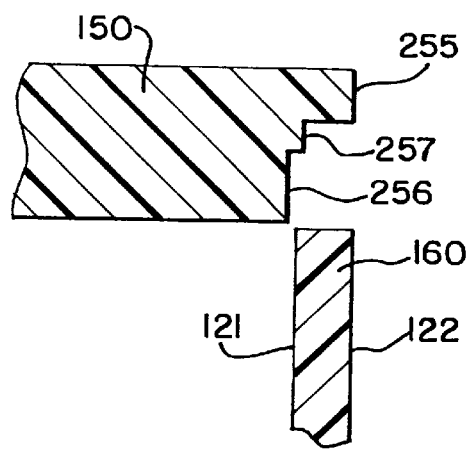

RENEWABLE FILTER

The appln claims the benefit of Provisional Ser. No. 60/033,387 filed Dec. 17, 1996.

BACKGROUND OF THE INVENTION

1. Field of the Invention

The present invention relates generally to filtering devices. In particular, the present invention relates to a renewable spin-on type filter including a high strength plastic housing.

2. Discussion of Background

Spin-on, twist-on type filters are used in numerous liquid and pneumatic applications throughout the agricultural, mobile, commercial and industrial markets. The housing or can for most spin-on disposable filters are manufactured by deep-draw forming of malleable materials such as aluminum. This technique limits the structural capabilities of current spin-on and twist-on type disposable products to the production capabilities of the metal forming industry and to the molecular characteristics of a limited number of specific malleable metals. Prior art disposable filters use a stamped steel or cast cover plate to secure the housing or can to a mounting and distribution head assembly. This plate typically has a threaded center hole and is spot welded and/or crimp sealed to a deep-drawn can. The purpose of the cover plate is to provide a mounting site that contains sufficient strength to allow operation of the filter at the required pressure rating. These prior art techniques for sealing and connecting the can to the plate, plus the structural limits of thin gauge malleable metals, restrict the application and uses of prior art spin-on, twist-on disposable filters. Recently new high pressure, high burst strength disposable filter housings with burst pressure ratings in the 1000 psi range have been developed for some narrowly defined markets and applications. However, even these newer high-strength filters remain applicationally limited because of their continued use of deep-drawn metal cans.

The filter media used in the prior art are usually paper products that are flexible and flimsy. As a result of their flexible and flimsy characteristics these filters often are not properly secured in place within the housing or can during the assembly of the filter. By some accounts 50% of current commercially available oil filters are defective and thus do not perform up to specification. Also, prior art paper filters often develop rips or tears during use. Such defects are not visible and the filter is used for its normal use period during which improperly filtered oil is re-circulated through the engine. Serious damage to the engine can result.

Once these disposable filters have served their purpose and are in need of replacement, the filter is removed from the vehicle or machine and the remaining filtrate, usually oil, is drained and replaced. Thereafter, the filter is compacted and disposed of in accordance with industry practice. The impact on the environment from the disposal of used filters and oil cannot be overstated when the variety of industrial and consumer applications that employ disposable filters, as well as the frequency with which they are replaced, is considered. The enormity of this situation and its impact on the environment can be appreciated when it is realized that there are currently about 180,000,000 vehicles in the United States for which it is recommend that the filter and oil be change every 3,000 miles. About 400,000,000 oil filters are manufactured in the U.S. each year, of which less than 25% are properly recycled. The remaining, which retain some oil, are disposed of and this used oil enters the environment. Even properly drained oil filters retain up to 8 ounces of used oil. It is estimated that the result of recycling would result in the recovery of more than 17,000,000 gallons of oil. If properly processed this oil could be reused.

Therefore, there exists a need for a twist-on filter that is renewable, which would support and encourage the recycling of used oil and reduce environmental liability.

SUMMARY OF THE INVENTION

According to its major aspects and briefly stated, the present invention is a renewable twist-on filter comprising a polymeric, unitary housing that is open at the top and includes a filter element adhesively secured within the interior of the housing. In one embodiment of the invention the housing is fitted with an external male thread, allowing its removable attachment to a head distribution assembly. This external male thread is disclosed as being cut or molded into the polymeric material of the housing, however a metallic member having machined threads could be secured to the housing by welding or bonding. Likewise the threaded member contained on the head distribution assembly can be either cut or molded into the polymeric material or a metallic member can be provide into which threads are machined. The advantage of utilizing metallic threaded members being that they are more durable and will have a longer service life.

In another embodiment of the invention the end cap or top member of the housing is provided with a female threaded center section for removably attaching the filter to the head distribution assembly. As stated above with regard to the earlier discussed embodiment the threaded members can either be formed in the polymeric material or threaded metallic members can be utilized. In this embodiment the end cap or top member is plastic welded to the hollow polymeric container to thus provide a closed housing having an interior chamber. Thus the end cap or top member is fused to the hollow polymeric container and this assembly now function as a closed housing having an interior chamber within which is securely attached the filter media. It should be noted that although this embodiment discloses a housing formed from a cup shaped member that is closed by a disc shaped end cap, the end cap need not be disc shaped but rather could be a cup shaped top member. It should also be noted that although the hollow polymeric container or cup shaped member is disclosed as being a unitary cast part it could also be fabricated from a section of polymeric tube having a molded bottom end member bonded or welded thereto. The essential feature being that the components from which the hollow housing are formed are welded together to form a closed housing having an interior chamber within which is securely attached the filter media. The filter is secured by adhesive at both ends within the housing such that the filter is immovable relative to the housing. In this embodiment the end cap or top member functions as a mounting means for the filter as well as an end cap or top member for the housing. The bottom of the filter is secured to the bottom or closed-interior-end of the housing by an adhesive material. The top of the filter is bonded within a circular groove formed in the inner surface of the end cap or top member. The filter thus divides the interior chamber of the housing into an inlet section and a discharge section. The filter medium may be any medium commonly employed in the art that is capable of being cleaned and subsequently reused.

In the preferred embodiment the filter is formed from a flat piece of metal mesh material cut to a shape having a pair of edges that when joined, by a weld or encapsulated by adhesive, cause the flat piece of material to assume the shape of a cone. The metal mesh material is folded or pleated radially prior to joining the edges such that after the edges are joined the filter is in the shape of a truncated cone having continuous top and bottom edges. The pleats extend from the top continuous edge to the bottom continuous edge. The surface area of the filter is greatly increased by this filter design.

When the filter requires cleaning, it is removed from the distribution head of the vehicle or machine, and the excess fluid contained therein is drained out. This small amount of fluid that is drained from the filter can be easily disposed of in a manner that is not detrimental to the environment. Thereafter, the filter is back flushed using a cleaning solution. Once cleaned, the filter may be dried prior to reuse by allowing it to stand for a period of time or by blowing a drying gas therethrough. As a result of using the highly efficient and reliable filter it is not necessary to change the oil each time the filter is cleaned. Test vehicles have currently exceeded 12,000 miles with out an oil change and test of the oil show no deterioration. These vehicles are expected to reach 25,000 miles before an oil change is necessary.

A major feature of the present invention is the unitary design of the polymeric housing. In the embodiment having external mounting threads, the need for a cover plate is eliminated because the external thread formed on the housing is capable of withstanding higher pressure values. Elimination of the coverplate reduces the number of operations required to fabricate the filter and thus reduces the cost of production.

Still another feature of the present invention is the combination of a polymeric housing and a renewable filter element. This combination enables the filter to be cleaned and recycled, which in turn significantly reduces the deleterious impact on the environment.

Other features and their advantages will be apparent to those skilled in the art from a careful reading of the Detailed Description of the Preferred Embodiments accompanied by the following drawings.

BRIEF DESCRIPTION OF THE DRAWINGS

In the drawings:

FIG. 5 is a cross-section view of the preferred embodiment of the present invention taken along lines 5—5 of FIG. 3.

FIG. 6 is a top view of the preferred embodiment of the present invention seen in FIG. 3.

FIG. 7 is an enlarged cross section view of a portion of the end cap at a location spaced above the hollow polymeric container FIG. 8 is an enlarged cross section view of a portion of the end cap at a location spaced above the hollow polymeric container showing another embodiment of the connection between the end cap and the hollow polymeric container.

DETAILED DESCRIPTION OF THE PREFERRED EMBODIMENT

Figure 2:
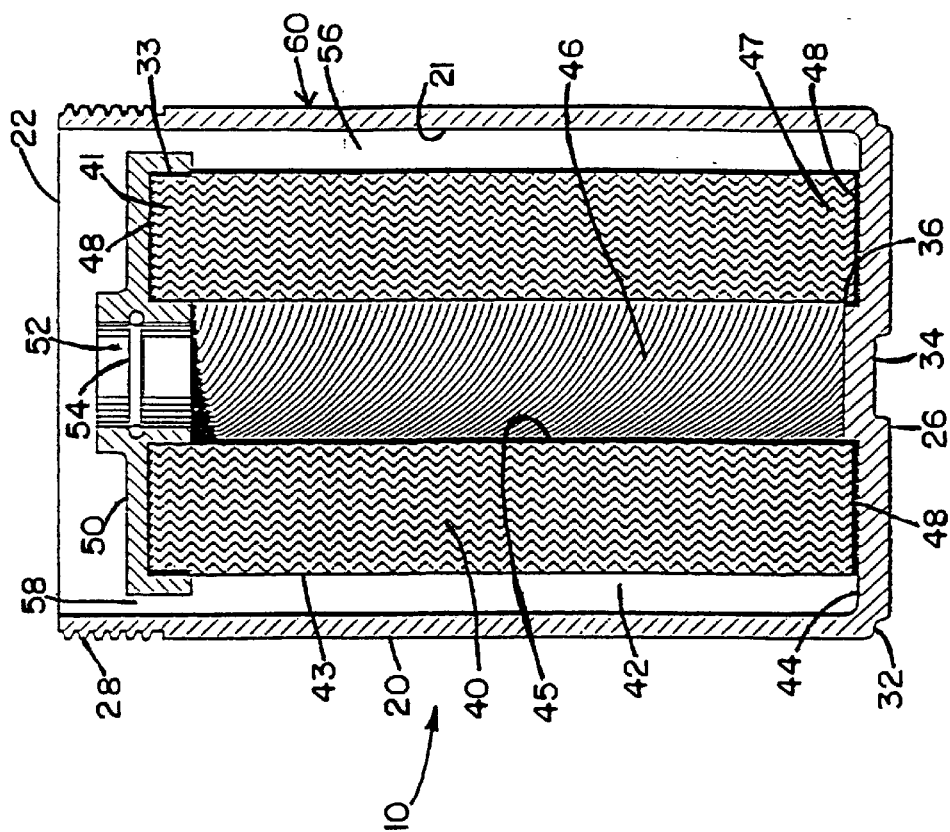
FIG. 2 is a cross-sectional side view of the embodiment of the present invention taken along lines 2—2 of FIG. 1.
Figure 1:
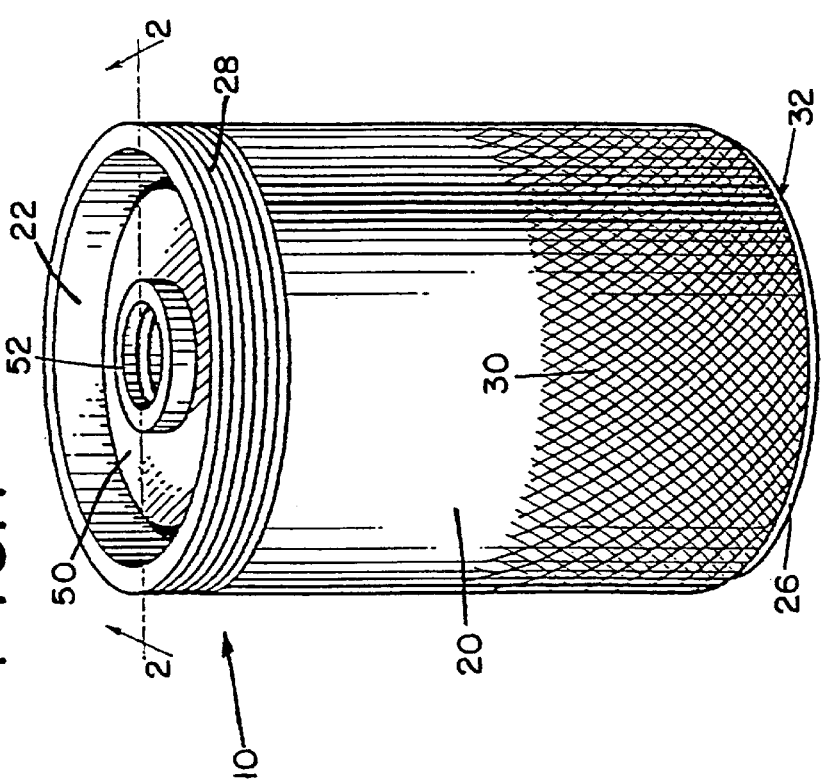
FIG. 1 is a perspective view of an embodiment of the present invention.

The present invention provides a renewable, spin-on type tube filter designed to remove particles from a lubricant or other industrial fluid. The filter advanced by the present invention is suitable for use in a wide variety of industrial applications. Referring now to FIGS. 1 and 2, there is shown a perspective view and a cross-sectional view, respectively, of a filter according to one embodiment of the present invention and generally designated by reference numeral 10. Filter 10 is comprised of a hollow housing 20 having a top-end portion including an end cap or top member 50 and a bottom-end portion. The hollow housing 20 has an interior chamber that is divided by filter element 40 into an inlet section and a discharge section. Housing 20 comprises a hollow polymeric container 60 having a bottom or closed-end 26 and an open-end 22. The interior chamber 42 of hollow housing 20 is defined by inner wall 21, floor or bottom surface 44 and the internal surface of end cap or top member 50.

An external thread 28 is formed about the perimeter of hollow polymeric container 66 proximate to open-end 22. Thread 28 may be manufactured to any size, which in turn enables filter 10 to achieve the specific pressure rating required by the particular application. Thread 28 is formed to removably mate with a variety of distribution heads commonly used in industry, thereby enabling filter 10 to be employed in a variety of industrial applications.

Hollow polymeric container 60 is made of any polymeric material that can operate in a temperature range between approximately −40° and 190° C. without experiencing thermal degradation. Hollow polymeric container 60 can be formed to assume any thickness and length. The dimensions of hollow polymeric container 50 are selected to provide a stable structure at its intended operating temperature and pressure. Preferably, hollow polymeric container 60 is made of a polymeric material impregnated with a quantity of glass fibers. Extending from bottom or closed-end 26, about the perimeter of hollow polymeric container 66, is a series of serrations 30 designed to permit an individual to grasp housing 20. Formed about the perimeter of bottom or closed-end 26 is an annular groove 32. A circular recess 34 is formed at the center of bottom or closed-end 26.

Extending into the interior 42 of hollow polymeric container 60 from floor 44 is an annular shoulder 36. Shoulder 36 is dimensioned to fit within the annular center 46 defined by filter element 40. Shoulder 36 serves to center filter element 40 within interior 42 of hollow polymeric container 60. As best seen in FIG. 2 the peripheral edge of end cap 50 is spaced from the inner wall 21 of the hollow polymeric container 60, which defines an annular opening that functions as the industrial fluid outlet 58. Filter element 40 may be fabricated of any filter medium commonly employed in the art, including but not limited to, stainless steel mesh, polyesters, and cellulosic materials. The mesh or porosity of the filter element 40 is determined by industrial fluid and operating conditions to which the filter will be exposed. The stiffness of the filter must be sufficient such that it maintains its geometric integrity and will not flex or deform when exposed to normal operating conditions and or to back flushing. Filter element 40 has an inlet surface 45 that is in fluid communication with the throughhole or industrial fluid inlet 52 and an outer or outlet surface 43 that is in fluid communication with the industrial fluid outlet 58. If filter 40 is constructed of bendable or flexible material, a perforated annular core made of metal or polymer may be required so that filter element 40 maintains its geometrical integrity. Filter element 40 is tubular and has an endless bottom or closed-end portion edge 47 and an endless top or open-end portion edge 41. The filter element 40 is secured along its bottom or closed-end portion edge 47 to floor 44 by an adhesive, potting or bonding material 48. The filter element 40 is secured along its top or open-end portion edge 41 in an annular groove 33 formed in the bottom surface of end cap 50. The annular groove 33 is located between the industrial fluid inlet 52, formed in end cap 50 and the industrial fluid outlet 58, formed by the peripheral edge of end cap 50 and inner wall 21 of the hollow polymeric container 60, and thus isolates the industrial fluid inlet 32 from the industrial fluid outlet 58. As a consequence of this isolation the industrial fluid that enters the inlet chamber of filter 10 through the industrial fluid inlet 52 must pass through the filter element 40 to reach the discharge section that is in fluid communication with industrial fluid outlet 58. Bonding material 48 may any type commonly employed in the art that will not react with the fluid being filtered and can withstand operating temperatures between approximately −40° C. and 190° C. Preferably, bonding material 48 is an epoxy resin.

The top or endless open-end portion edge 41 of filter element 40 is secured to end cap 50 using bonding material 48.

In the embodiment illustrated in FIGS. 1 and 2 end cap 50 may be made of either a metal or polymer and is formed to have a throughhole or industrial fluid inlet 52 in registration with annular center 46 of filter element 40. An O-ring 54 is provided in industrial fluid inlet 52 that functions as a fluid seal between throughhole or industrial fluid inlet 52 and the distribution head.

Hollow polymeric container 66 can be manufactured using any process commonly employed in the art. Preferably, housing 20 is manufactured using an injection molding process. In assembling filter 10, filter element 40 is secured to end cap 50 using bonding material 48. Bonding material 48 is then applied to floor 44 of hollow polymeric container 66. Filter element 40 and end cap 50 are then placed within interior 42 of hollow polymeric container 66 and secured to floor 44.

When filter 10 requires cleaning, it is removed from the distribution head and the excess lubricant is drained from it. Thereafter, a cleaning solution is injected into housing 20 in the direction opposite to the direction of filtration. For example, cleaning solution may be directed through industrial fluid outlet 58 into annulus 56 which is defined by outer surface 43 of filter element 40 and the inner wall 21 of hollow polymeric container 66. The injection of solution into annulus 56 effectuates the removal of particulates from filter element 40 and transports the fluid entrained particles into annular center 46 and subsequently from the interior 42 of hollow polymeric container 66. Alternatively, cleaning solution may be injected through industrial fluid inlet 52 into annular center 46 to thereby cause the removal of particulates from filter element 40 through annulus 56 and industrial fluid outlet 58 to the exterior of housing 20. After cleaning, filter 10 is dried and reused.

Figure 3:
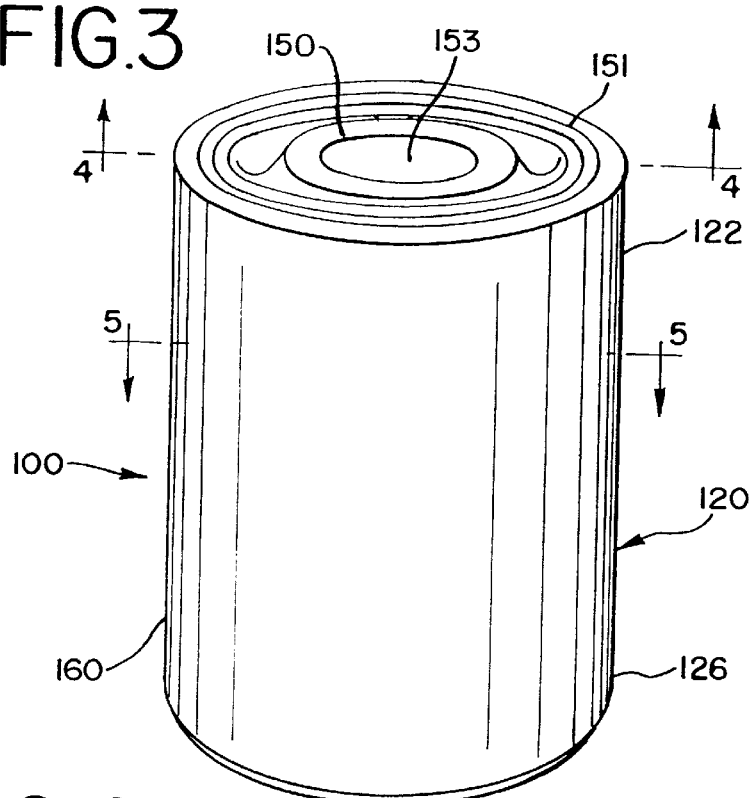
FIG. 3 is a perspective view of the preferred embodiment of the present invention.
Figure 4:
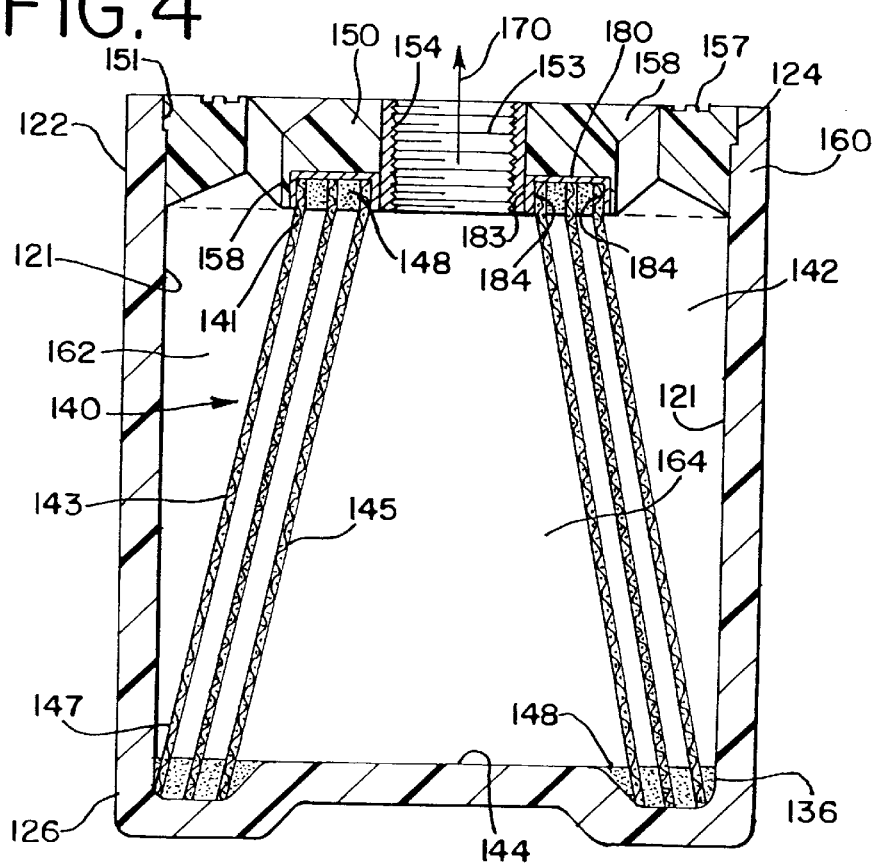
FIG. 4 is a cross-section view of the preferred embodiment of the present invention taken along lines 4—4 of FIG. 3.

Referring now to FIGS. 3–8 the preferred embodiment of the present invention will be discussed. FIG. 3 is a perspective view of a filter according to this embodiment of the present invention and is generally designated by reference numeral 100. Filter 100 is comprised of a hollow housing 120 having a top-end portion, including an end cap or top member or plastic distribution or connector head 150 and a bottom-end portion. It should be noted that although this embodiment discloses a housing formed from a cup shaped member 160 that is closed by a disc shaped end cap 150, the end cap or top member need not be disc shaped but rather could be a cup shaped top member. It should also be noted that although the hollow polymeric container or cup 160 shaped member is disclosed as being a unitary cast part it could also be fabricated from a section of polymeric tube having a molded bottom member bonded or welded thereto. The essential feature being that the components from which the hollow housing 120 are formed are welded together to form a closed housing having an interior chamber 142 within which is securely attached the filter media 140. As best seen in FIGS. 4 and 5, which are cross-section views taken along lines 4—4 and 5—5 respectively of FIG. 3, housing 120 has an interior chamber that is divided into a inlet section and a discharge section by filter element 140 The filter element 140 is securely mounted within the housing. Housing 120 includes a cup, can or hollow container 160 having a bottom or closed-end 126 and an open-or top end 122. Hollow polymeric container 160 has an interior 142 that is defined by inner wall 121 and a floor or bottom surface 144.

Filter element 140 has a frusta conical shape and has an endless bottom or closed-end portion edge 147 and an endless top or open-end portion edge 141. The filter element 140 is secured along its bottom or closed-end portion edge 147 in a circular groove 136, formed in floor 144, by an adhesive, potting or bonding material 148. The filter element 140 is secured along its top or open-end portion edge 141 in an annular groove 138 formed in the bottom surface of 150. The annular groove 139 is located between the industrial fluid inlet 153, formed in end cap or top member 150 and the industrial fluid outlets 158, formed in end cap or top member 150, and thus isolates the industrial fluid inlet 153 from the industrial fluid outlets 158. As a consequence of this isolation the industrial fluid that enters the inlet section of filter 100 through the industrial fluid inlet 153 must pass through the filter element 140 to reach the discharge section from which it is discharged through industrial fluid outlets 158.

As is best seen in FIG. 7, the inner wall 121 of hollow polymeric container 160 has a recessed rim 124 formed along its upper edge that is of a larger diameter than inner wall 121. The peripheral edge 155 of end cap or top member 150 has a diameter that is slightly smaller than the diameter of recessed rim 124 and thus the end cap or top member 150 can be lowered into the open end of hollow polymeric container 160 without interference. A band 125 of polymeric material, having a diameter smaller than recessed rim 124 and larger than inner wall 121 is provided as a step between the bottom of recessed rim 124 and the inner wall 121. During assembly of the filter 100, as the end cap 150 is lowered into hollow polymeric container 160 the bottom surface of end cap or top member 150 encounters band 125 which prevents end cap or top member 150 from becoming fully seated in hollow polymeric container 160. As will be discussed in more detail this interference with band 125 will be overcome, during the plastic welding process that secures the end cap 150 to the hollow polymeric container 160. Thus, when assembly is complete the end cap member 150 will be fully seated in the open end 122 of hollow polymeric container 160. As shall be further discussed end cap member 150 is permanently secured to housing 120 by a plastic weld The end cap or top member 150 has a central circular bore 152 formed therein into which is secured an internally threaded metallic collar 154. The internally treaded metallic collar 154 can be secured in central circular bore 152 by bonding material 148 or by plastic welding. If it is to be secured by plastic welding then the outer surface of threaded metallic collar 154 is grooved or serrated to receive the liquid polymeric material during welding and thus lock the threaded metallic collar 154 in place. The threaded collar 154 is formed to mate with a variety of distribution heads commonly used in the industry, thereby enabling filter 100 to be employed in a variety of industrial applications. The fluid to be filtered enters the filter 100 through the connection between the threaded collar 154 and the distribution head. Arrow 170, seen in FIG. 4, indicates the direction that the industrial fluid to be filter flows as it enters filter 100. The opening 153 formed by the internally threaded collar is referred to as the industrial fluid inlet. The end cap or top member 150 is also provided with a plurality of outlets 158 through which the industrial fluid exits the filter 100. As illustrated in FIG. 6 there are four arc shaped outlets 158 that are concentric with bore 152. The arc shaped outlets 158 are separated by bridges 159. The end cap or top member 150 includes a circular groove 157 formed in its upper or outer surface that receives a mating ring shaped member that is integral with the distribution head of the internal combustion engine or other device that the filter 100 is secured to. An O-ring or other seal can be contained in the circular groove 157 to assure a liquid seal between the end cap or top member 150 and the distribution head. A concentric circular groove 138 is formed in the lower or internal surface of end cap or top member 150. The upper edge of the filter element 140 is received in groove 138.

Hollow polymeric container 160 and end cap or top member 150 are made of any polymeric material that can operate in a temperature range between approximately −40° and 190° C. without experiencing thermal degradation. Hollow polymeric container 160 can be formed to assume any thickness and length. Preferably, hollow polymeric container 160 is made of a polymeric material impregnated with a quantity of glass fibers.

The interior 142 of hollow polymeric container 160 is defined by an inner wall 121 and a floor 144. A circular groove 136 is formed in floor 144. Groove 136, as illustrated in FIG. 4, is located at the intersection of wall 121 and floor 144 but could be spaced centrally of this intersection. Groove 136 serves to receive the lower or bottom edge 147 of the filter element 140. Filter element 140 may be fabricated of any filter medium commonly employed in the art, including but not limited to, stainless steel mesh, polyesters, or cellulose materials. Filter element 140 has an inlet surface 145 that is in fluid communication with the industrial fluid that enters filter 100 through industrial fluid inlet 153 and an outer or outlet surface 143 that is in fluid communication with the industrial fluid outlets 158.

The filter element 140, that is illustrated in FIGS. 4 and 5, is formed from a flat piece of material cut to a shape that includes a pair of edges that when joined by a weld or encapsulated by adhesive cause the flat piece of material to assume the shape of a cone. In the preferred embodiment the material is stainless steel wire mesh, which provides a filter element that is stiff and will not be distorted or bent by the fluid flow through it. The metal mesh material is folded or pleated radially prior to joining the edges such that after the edges are joined the filter is in the shape of a truncated cone having continuous top and bottom edges. Radial pleats are formed in the flat piece of material that extend from the upper peripheral edge to the lower or outer peripheral of the right circular cone shaped filter. The pleats are formed such that their amplitude becomes greater as they progress from the periphery of the central hole to the lower peripheral edge. As a result of forming these pleats and joining the edges the flat piece of material assumes the shape of a frustum of a right circular cone. The surface area, and thus the filtering capacity of the filter element 140 is greatly increased as a result of the pleats. Furthermore the rigidity, and therefore the geometric integrity, of the filter element 140 is also increased considerably as a result of the pleats.

It should be noted that although the filter having the shape of a right circular cone is the preferred shape for the filter, filters having other shapes, for example tubular, can be used with this invention.

The large or bottom peripheral edge 147 of filter element 140 is secured in groove 136 formed in floor 144 by an adhesive, potting or bonding material 148. Bonding material 148 may any type commonly employed in the art that will not react with the fluid being filtered and can withstand operating temperatures between approximately −40° C. and 190° C. Preferably, bonding material 148 is an epoxy resin. This bonding permanently secures the lower edge of the filter 140 to the hollow polymeric container 160 such that there can be no relative movement therebetween.

The small or top peripheral edge 141 of filter element 140 is secured in groove 138 formed in the bottom surface of end cap or top member 150 using bonding material 148. This bonding permanently secures the upper edge of the filter 140 to the end cap or top member 150 such that there can be no relative movement therebetween.

In fabricating and assembling the filter 100, hollow polymeric container 160 and end cap or top member 150 are manufactured using any process commonly employed in the art. Preferably, hollow polymeric container 160 and end cap or top member 150 are manufactured by an injection molding process. Thereafter, filter element 140 is secured in groove 138 formed in end cap or top member 150 using bonding material 48. Bonding material 148 is then place in groove 136, formed in floor 144. The filter element with the attached end cap or top member 150 is then lowered into the hollow polymeric container 160 and the large or lower peripheral edge of filter element 140 approaches the groove 136 that contains bonding material 148. The peripheral edge 155 of end cap or top member 150 enters the open end 122 of the hollow polymeric container 160 and is aligned with the recessed rim 124 of the inner wall 121. As the filter element with the attached end cap 150 is lowered further the band 125 of polymeric material engages the bottom surface of end cap 150. The end cap 150 has been manufactured such that the diameter of the peripheral edge 155 is slightly smaller than the diameter of the rim 124 of the hollow polymeric container 160. The end cap 150 is then subjected to an ultrasonic welder which melts the band 125 of polymeric material which enables the end cap 150 to be forced downwardly into place in the hollow polymeric container 160. The melted material of band 124 then forms a bond with the rim 124 of the inner wall 121 and the peripheral edge 155 of end cap 150. As a result the end cap 150 has been permanently secured to the hollow polymeric container 160 to form the housing 120. As a result of the end 150 being permanently secured to the hollow polymeric container 160 and the top and bottom edges of filter 140 being permanently secured to grooves 138 and 136, respectfully, there can be no relative movement of filter 140 relative to housing 120.

Ultrasonic plastic welding is the preferred plastic welding process. An ultrasonic plastic welding apparatus has one or more sonic horns. Each sonic horn has a generator-transducer for ultrasonically activating the horn and its welding blades. When the sonic horn is activated vibrations in the range of 20,000 cycles per second are created, producing heat which melts the plastic material being welded. After deactivation of the sonic horn a permanent welded bond is formed between the end cap 150 and the hollow polymeric container 160. This permanent bond locks the filter in place within the now enclosed housing 120.

When filter 100 requires cleaning, it is removed from the distribution head and the excess lubricant is drained from it.

Thereafter, a cleaning solution is injected into housing 120 in the direction opposite to the direction of filtration. For example, cleaning solution is be directed into outlets 158. The injection of solution into outlets 158 effectuates the removal of particulates from filter element 140 and transports the fluid entrained particles into the conical shaped center of the filter element 140 and subsequently out of filter 100 through industrial fluid inlet 153. Alternatively, cleaning solution may be injected into industrial fluid inlet 153 to thereby cause the removal of particulates from filter element 140 through the outlets 158 formed in end cap or top member 150. After cleaning, filter 100 is dried and reused.

Another embodiment for the bonding of the peripheral edge of end cap 150 to the inner wall 121 of the hollow polymeric container 160 is illustrated in FIG. 8. In this embodiment the peripheral edge of end cap 150 has an upper section 255 that has the same diameter as the outer diameter of the hollow polymeric container 160 and a lower section 256 that is slightly smaller than the inner diameter of the hollow polymeric container 160. This allows the lower section 256 of end cap 150 to enter the open upper end of the hollow polymeric container 160 without interference. The peripheral edge of end cap 150 includes a band portion 257 that has a diameter that is larger than the diameter of the lower section 256 and smaller than the diameter of the upper section 255. As the end cap 150 is lowered into the hollow polymeric container 160 the band portion 257 will encounter the upper edge of the hollow polymeric container 160 and prevent the end cap 150 from fully seating. At this point of the fabrication the ultrasonic welding operation commences which melts the material forming the band portion 257 permitting the end cap to completely seat in hollow polymeric container 160 and form a bond therewith. This embodiment has the advantage that there wilt not be a resulting bead of weld on the upper surface of the end cap 150 which could interfere with the attachment of the filter 100 to the distribution head.

It should be understood that the foregoing disclosure is illustrative of the broad inventive concepts comprehended by this invention and that various other modifications and improvements may be made to the invention without departing from the spirit of the disclosed concept.

What is claimed is:

1. A filter for filtering industrial fluids that can be renewed at the end of a use period for use in subsequent use periods comprising:

a hollow housing having an interior chamber:

said housing comprising a hollow polymeric container having a closed-end and an open-end, and a polymeric top member permanently secured to said container for closing the open end of said hollow polymeric container, said polymeric top member having an industrial fluid inlet formed therein through which industrial fluid to be filtered enters said interior chamber of the hollow housing;

said polymeric top member having an industrial fluid outlet formed therein through which filtered industrial fluid exits said interior chamber of the hollow housing;

a frusta conically shaped filter element disposed within said interior chamber of the hollow housing, said filter element being constructed of a stainless steel mesh and includes an endless bottom-end portion edge and an endless top-end portion edge, wherein said bottom-end portion edge has a diameter that is larger than a diameter of said top-end portion edge and is secured to said hollow housing such that it divides said interior chamber of said hollow housing into an inlet section and an discharge section, said inlet and discharge sections being isolated from each other such that fluid received in said inlet section must pass through said filter element to reach said discharge section;

said filter element having a radially inner surface that is adjacent said inlet section and said industrial fluid inlet and a radially oulet surface that is adjacent said discharge section and industrial fluid outlet such that the filter element will retain contaminates carried by the industrial fluid as industrial fluid passes through said filter element;

grooves formed in said closed-end of the hollow polymeric container and in said polymeric top member receiving said endless bottom-end portion edge and said endless top-end portion edge of said filter element, respectively;

said top member being permanently secured to said hollow polymeric container at a fully seated position, at which said filter edges are seated in said grooves such that said filter element is permanently fixed to and unmovable relative to said hollow housing; and said polymeric top member and hollow polymeric container having dimensions and shapes prior to assembly such that there is interference between the polymeric top member and the open-end of said hollow polymeric container, said interference being sufficient to prevent said top member from being pressed to said fully seated permanent position, which interference is eliminated by performing the step of plastic welding which allows the polymeric top member to move to said fully seated permanent position in said open-end of said hollow polymeric container.

2. A method of cleaning the filter element of a renewable filter comprising the steps of:

providing a filter according to claim 1;

draining any industrial fluid from said renewable filter;

supplying a pressurized cleaning solution to said housing through said industrial fluid outlet;

allowing said pressurized cleaning solution to escape from said housing through said industrial fluid inlet, such that said pressurized cleaning solution dislodges and flushes out through said industrial fluid inlet said retained contaminates that are held by said filter element.

3. A method of cleaning the filter element of a renewable filter comprising the steps of:

providing an filter according to claim 1;

draining any industrial fluid from said renewable filter;

supplying a pressurized cleaning solution to said housing through said industrial fluid inlet;

allowing said pressurized cleaning solution to escape from said housing through said industrial fluid outlet such that said pressurized cleaning solution dislodges and flushes out through said industrial fluid outlet said retained contaminates that are held by said filter element.

4. A renewable filter for filtering industrial fluids as set forth in claim 1, wherein said endless bottom-end portion edge is bonded by an epoxy resin, along its entire extent, to the bottom-end portion of said housing and said endless top-end portion edge is bonded, along its entire extent, to said top-end portion of said housing.

* * * * *